Figure 1:
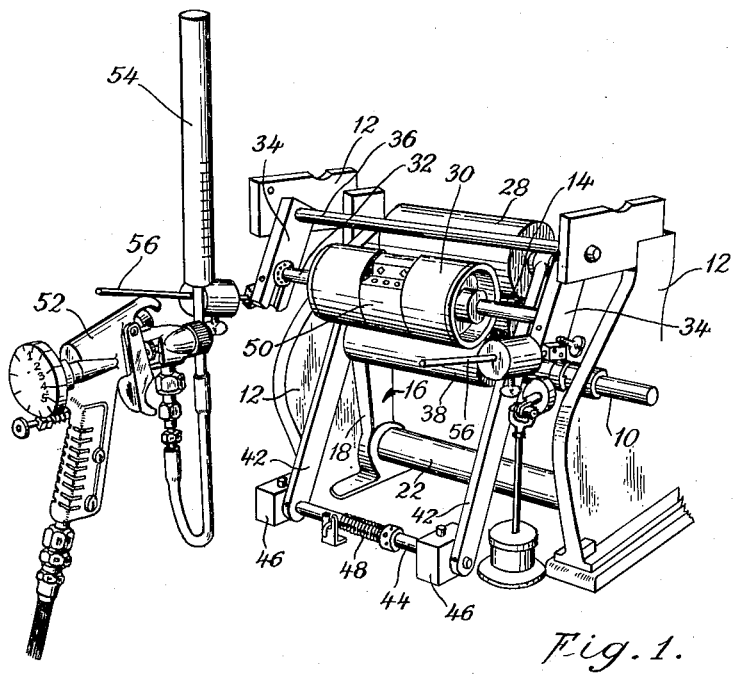

July 25, 1961 P. W. GREUBEL 2,993,371
APPARATUS FOR TESTING INKS
Filed July 24, 1959 3 Sheets-Sheet 1

INVENTOR.
Paul W. Greubel

INVENTOR.
Paul W. Greubel

United States Patent Office

2,993,371
Patented July 25, 1961

2,993,371
APPARATUS FOR TESTING INKS
Paul W. Greubel, Great Neck, N.Y., assignor to Interchemical Corporation, New York, N.Y., a corporation of Ohio
Filed July 24, 1959, Ser. No. 829,328
3 Claims. (Cl. 73—150)

This invention relates to an apparatus for the measurement of properties of printing and lithographic inks. More particularly, it relates to an apparatus for the testing of lithographic inks under the dynamic conditions of lithographic printing and in the presence of the fountain solutions used in such printing.

U.S. Patent No. 2,101,322 to R. F. Reed issued December 7, 1937 discloses a method and apparatus for testing printing and lithographic inks, especially the tack and length thereof. Tack is defined as the relative degree of stickiness or cohesiveness, or more specifically, as the resistance to splitting by a thin film of the ink which causes a sheet of paper to adhere to the form after a printing impression is made. Length is defined as the relative tendency of an ink to flow in a continuous stream or string. In the arts of printing and lithography, the tack and length of the inks are two of the primary characteristics of the inks which affect the productive capacity of the press and the quality of the printed products.

While the apparatus disclosed in the above mentioned patent has been very effective in the testing of printing inks, serious difficulties have arisen in the use of said apparatus or any other existing testing apparatus in the testing of lithographic inks. Since lithographic printing employs a fountain solution, some of the fountain solution invariably becomes mixed with the ink under the dynamic conditions on such a press during operation thereof. This results in an ink-water system rather than an ink system being used in the offset printing. The extent and the nature of the ink-water mixture is dependent upon a number of variable factors including the composition of the fountain solution, the composition of the inks and the nature of the lithographic plate. Because it does not provide means which take into account these variable factors that result in an ink-water system, the apparatus of Patent No. 2,101,322 has serious limitations in the testing of lithographic inks. The testing of lithographic inks by the apparatus of said patent produces unrealistic results because an ink-water system is being judged by ink system standards.

Accordingly, it is the object of this invention to provide a test instrument to study the behavior of lithographic inks under the dynamic conditions of a lithographic press and in the presence of fountain solution.

It is a further object of this invention to provide an apparatus for quantitatively determining the tack of lithographic inks under variable conditions of press speed, temperature, nature and quantity of fountain solution used and nature of plate used.

It is yet a further object of this invention to provide a test device which studies the behavior of various lithographic printing plates and fountain solutions as well as particular combinations of selected inks, fountain solutions and lithographic plates under the dynamic conditions of a lithographic press.

To accomplish these objects, this invention provides in operative association with the apparatus disclosed in U.S. Patent No. 2,101,322 a combination of additional elements which coact with the apparatus of said patent to reproduce the dynamic conditions of lithographic printing and to subject the inks being tested to such conditions. U.S. Patent No. 2,101,322 is directed to a method and apparatus for determining the characteristics of tack and length of an ink by measuring the force required to split a film of ink continuously. The force required to split the film at a particular rate of splitting when the ink is held at predetermined temperature is a measurement of the tack of the material comprising the film. Further, when the tack of a particular ink is determined at two or more rates of splitting (the temperature remaining constant) and when the results in terms of force are plotted against the rates of splitting corresponding to these particular tack values, the slope of the curve which is thus obtained has been found to accurately indicate the length of the ink. The apparatus of said patent which accomplishes these measurements essentially comprises a power driven cylindrical roller rotative within a frame carrying said roller, a cradle free to swing about the longitudinal axis of the cylindrical roller, a roller of resilient composition rotatably mounted within the cradle and in tangential contact with the cylindrical roller, and a measuring device adapted to measure the torque transmitted to the cradle when the ink subject to investigation is applied as a coating to the rollers.

The present invention provides a rotatably mounted lithographic plate cylinder which is operatively associated with the apparatus of said patent by means of a rotatably mounted rubber form roller in tangential contact with both said lithographic plate cylinder and the power driven cylindrical roller of the apparatus of the patent.

A spray gun mounted proximate the lithographic cylinder is equipped with means impinging a regulated flow of fountain solution onto said plate cylinder. It is thus seen that with the combination of this invention, the nature and amount of fountain solution used, the nature of the lithographic plate as well as the temperature and press speed may be varied to subject the ink being tested to the dynamic and ink-water conditions of the operating lithographic press. Means are also provided for disengaging the lithographic plate cylinder to permit the use of the apparatus to test nonlithographic inks.

Figure 2:
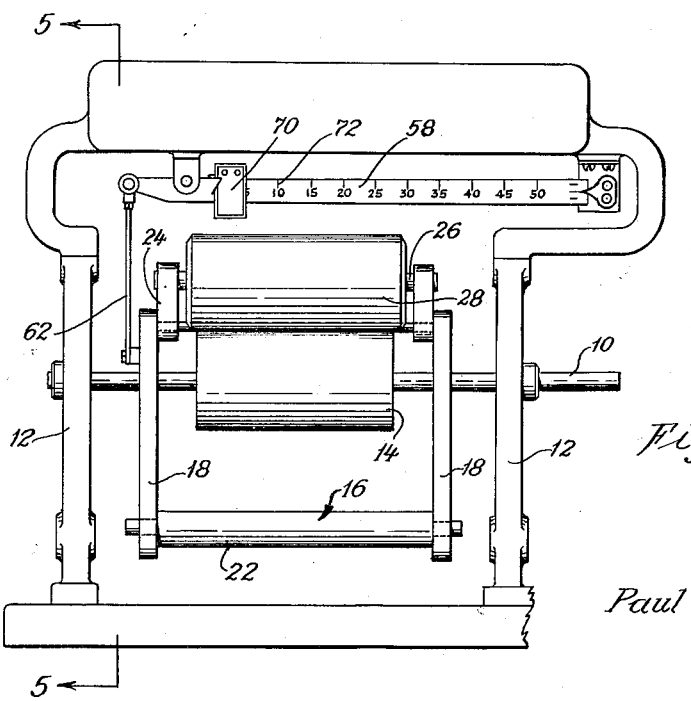
Figure 3:
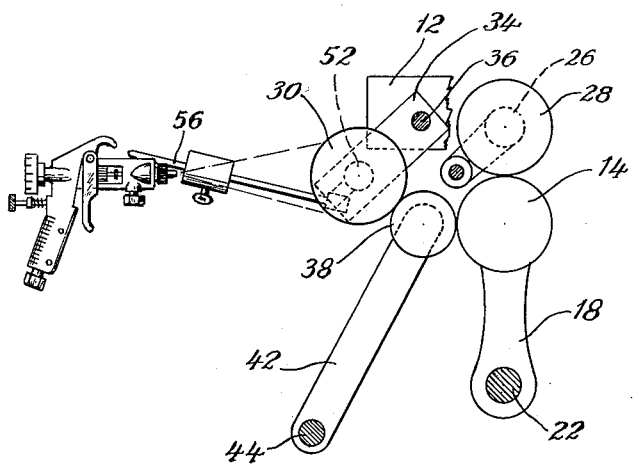
Figure 4:
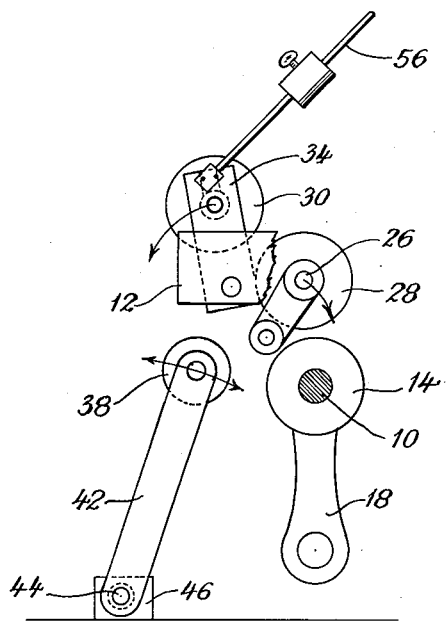
Figure 5:
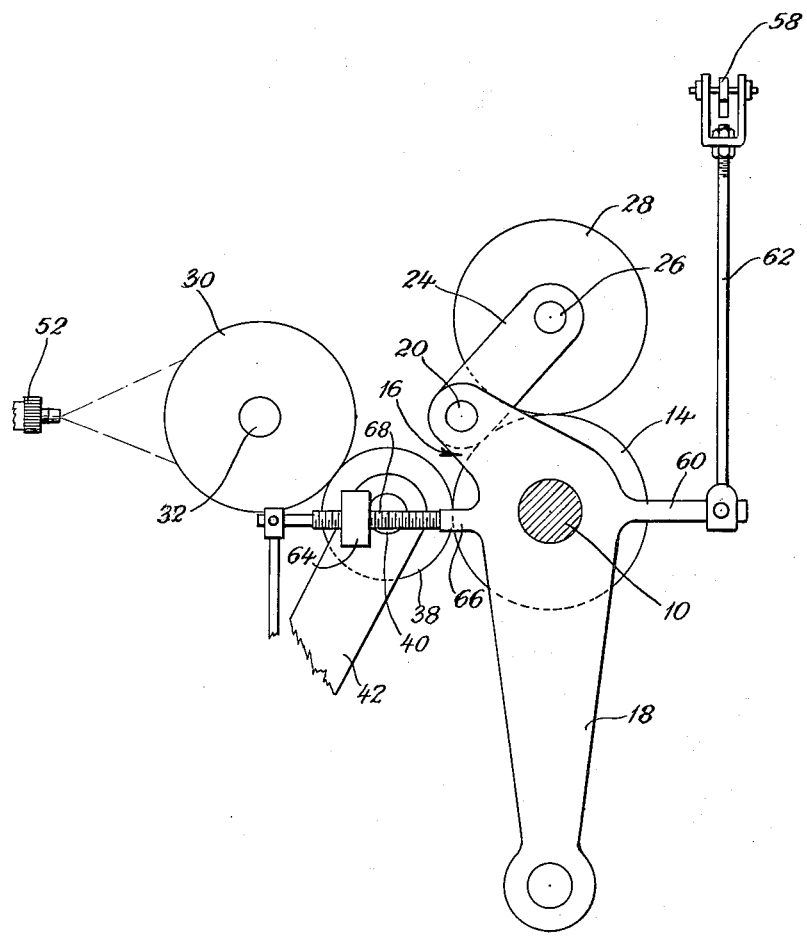

Other objects and further advantages will be more fully apparent from a description of the accompanying drawings in which:

FIGURE 1 is a prospective rear view of the instrument.
FIGURE 2 is a front elevation of the instrument.
FIGURE 3 and 4 are diagrammatic views showing the relationship of the rollers when the lithographic plate cylinder is respectively engaged and disengaged.
FIGURE 5 is a fragmentary sectional view taken on lines 5—5 of FIGURE 2 to show the relationship of the measuring elements.

Referring now to FIGURES 1 and 2 of the drawings, cylindrical roller 14 having a polished hard metal surface is mounted on power driven shaft 10 carried on frame 12. Cylindrical roller 14 may have its temperature controlled by the circulating water means described in U.S. Patent No. 2,101,322. Mounted to rotate about the longitudinal axis of cylindrical roller 14, externally of the confines of said cylindrical roller is a cradle 16 rotatably mounted on shaft 19. FIGURE 5 shows a fragmentary sectional side view showing the cradle mechanism in greater detail. The cradle comprises a pair of side members 18 and shaft 20 joining said side members. Between side members 18, at the lower terminals thereof, fixed weight 22 is mounted. A pair of arms 24 are mounted on shaft 20 proximate side members 18. Shaft 26 having roller 28 mounted thereon is rotatably journaled within arms 26. Roller 28 is normally in tangential resting contact with cylindrical roller 14. Roller 28 is preferably surfaced with a resilient composition such as that used in surfacing printers' rollers. The above described components are substantially the same as those described in U.S. Patent No. 2,101,322. Referring now to FIGURE 1 which shows the apparatus of this invention in operative position, plate cylinder 30 is mounted on shaft 32 which is rotatably journaled in arms 34. Arms 34 are pivotally mounted at opposite ends of shaft 36 carried on frame 12. Plate cylinder 30 is in tangential contact with form roller 38 which is mounted on shaft 40 which is in turn rotatably journaled in a pair of arms 42. Form roller 38 is preferably surfaced with a resilient composition such as that used in surfacing conventional lithographic ink form rollers. Arms 42 are mounted on shaft 44 which is rotatably mounted across a pair of blocks 46. Spring tensioning means 48 act to tense form roller 38 toward cylindrical roller 14 and away from plate cylinder 30 with which form roller 38 is also in tangential contact. Plate cylinder 30 carries a detachable plate 50 having the sensitized and desensitized areas of conventional lithographic plates. Spray gun 52 is positioned so as to impinge fountain solution against the plate cylinder during the operation of the apparatus. Spray gun 52 has means for regulating the rate at which the fountain solution is sprayed as well as a calibrated reservoir 54 which indicates the volume of fountain solution used. When the instrument is being used to test non-lithographic inks provision is made for disengaging plate cylinder 30 and form roller 38 from the remaining apparatus, thus permitting the instrument to function in the manner described in U.S. Patent No. 2,101,322. Such disengagement may be best seen by considering FIGURE 1 together with FIGURES 3 and 4 which respectively show the plate cylinder 30 in the engaged and disengaged position. A pair of handles 56 are mounted, one on each arm 34. By pivoting these handles in a clockwise direction, the operator will pivot plate cylinder 30 out of engagement with form roller 38. Form roller 38, and arms 42 may then be pivoted out of contact with cylindrical roller 14. This will leave the instrument in the disengaged position shown in FIGURE 4.

Before considering the operation of this instrument, let us consider apparatus for measuring the force of torque which is indicative of the track of the ink. The apparatus for measuring the force is substantially the same as that in Patent No. 2,101,322. Referring now to FIGURES 2 and 5, measurement of torque tending to cause angular rotational displacement of roller 28 with respect to roller 14 is accomplished by the use of a measuring apparatus comprising a graduated beam 58 connected to arm 60 of cradle 16 by means of link 62, a weight 64 mounted on arm 66 of cradle 16, the position of weight 64 being adjustable along external screw thread 68 on arm 66, weight 64 having a corresponding internal screw thread passing therethrough to statically balance the weight system at the time that the rollers are in contact without applied ink and when the adjustable weight 70 which is slidably mounted on graduated beam 58 is at the zero position on scale 72 of beam 58. Cradle 16 is mounted to rotate about shaft 10 together with fixed weight 22, shaft 20, arms 24 and roller 28. It is preferable that the collective center of gravity of the cradle together with all of these appendages be below the longitudinal axis of the shaft 10 so that they will come to rest in a vertical position when the applied torque from the cylindrical roller 14 is counterbalanced. In this manner, the statically balanced cradle rests in a vertical position.

The term statically balanced is used to indicate the relationship of the force components acting on the cradle while the rollers are not in motion. The term dynamic balance is intended in this disclosure to designate the balance of the cradle while the rollers are in motion. Thus after a film of ink is applied to rotating cylindrical roller 14, the cradle will assume an angular position deviating from its vertical position of rest and the weight 70 may then be adjusted to restore the cradle system to the vertical position in which it may be said that the cradle is dynamically balanced, and in which the amount of applied force is an indication of the torque tending to rotate the cradle.

In operating the instrument, power driven shaft 10 carrying cylindrical roller 14 is driven at a constant speed by suitable driving means such as an electric motor. The instrument is then dynamically balanced so that weight 70 is at 0 on scale 72. This is accomplished by moving weight 64 along screw thread 68 on arm 66 until the desired condition of balance is obtained.

The ink to be tested is then applied to the surface of polished roller 14. It is known that during the operation of the apparatus, the ink applied will form a uniform layer on all the rollers and cylinders of the system which are in engagement with each other. Thus, the ink is applied in a quantity calculated to provide a film of known thickness on the rollers. Since a lithographic ink is being tested, form roller 38 is placed in the engaged position with respect to the remaining rollers. Before plate cylinder 30 is placed into engagement with form roller 38, spray gun 52 commences to impinge a fountain solution against plate cylinder 30. The cylinder is then engaged and spray gun 52 continues to impinge the fountain solution against the plate cylinder at a selected rate of speed. Roller 28 in addition to being rotated about its own axis by cylindrical roller 14, also tends to rotate the entire cradle about the axis of cylindrical roller 14. Weight 70 is then adjusted to again bring the cradle to a balanced position. The position of the slidable weight 70 which is the scale reading represents the moment or torque transmitted to the cradle, which is a measure of the force required to split the film of the ink-water system covering the rollers. This is a measure of the tack of the ink-water system under the conditions of the test.

The apparatus of this invention is further readily usable to test lithographic plates as well as fountain solution. For example, a particular plate may be readily compared qualitatively to another standard lithographic plate. The standard plate is first tested using given quantites of selected fountain solutions and inks as well as selected press speeds and atmospheric conditions. A direct impression is manually made from plate 30 onto a sheet of paper. The standard plate is then detached from the plate cylinder and the plate to be tested is mounted in its place and subjected to the same conditions as was the standard plate. An impression is made on paper and compared to that of the standard plate.

It will be obvious to those skilled in the art that the nature and quantity of fountain solution usable may be tested by similar techniques.

It will be thus seen that this invention further provides a testing device in which the manifold conditions to which combinations of ink, fountain solutions and lithographic plates are subjected to as well as the properties of these lithographic printing elements may be varied in order to reproduce the conditions of the lithographic press in a testing device.

While there have been described what is at present considered to be the preferred embodiment of this invention, it will be obvious to those skilled in the art that various changes and modifications may be made therein within departing from the invention, and it is, therefore, aimed to cover all such changes and modifications as fall within the true spirit and scope of the invention.

What is claimed is:

1. A device for testing lithographic ink comprising a power driven roller having a hard surface, a first rotatably mounted roller having a resilient surface in tangential engagement with said power driven roller, a rotatably mounted lithographic plate cylinder in tangential engagement with said first rotatably mounted roller, means for spraying lithographic fountain solution onto said lithographic plate cylinder at a constant rate, a second rotatably mounted roller having a resilient surface in tangential engagement with said power driven roller, said second rotatably mounted roller being free to rotate about the axis of said power driven roller, and having attached to its mounting a measuring device adapted to measure the torque tending to drag said second rotatably mounted roller about said power driven roller when a film comprising a mixture of fountain solution and ink is being continuously split between said second rotatably mounted roller and said power driven roller.

2. The device for testing lithographic inks defined in claim 1, further including means for selectively disengaging and engaging said lithographic plate cylinder from said first rotatably mounted roller and means for selectively disengaging and engaging said first rotatably mounted roller from said power driven roller.

3. The device for testing lithographic inks defined in claim 1 wherein said lithographic plate cylinder has a detachably mounted plate.

References Cited in the file of this patent

UNITED STATES PATENTS

| | | |
|---|---|---|
| 1,939,814 | Hoch | Dec. 19, 1933 |
| 2,101,322 | Reed | Dec. 7, 1937 |